United States Patent
Roy et al.

(10) Patent No.: US 9,131,807 B2
(45) Date of Patent: Sep. 15, 2015

(54) ROBOTIC KITCHEN TOP COOKING APPARATUS AND METHOD FOR PREPARATION OF DISHES USING COMPUTER RECIPIES

(76) Inventors: Shambhu Nath Roy, Sunnyvale, CA (US); Riya Bhattacharya, Sunnyvale, CA (US)

(*) Notice: Subject to any disclaimer, the term of this patent is extended or adjusted under 35 U.S.C. 154(b) by 43 days.

(21) Appl. No.: 13/151,288

(22) Filed: Jun. 2, 2011

(65) Prior Publication Data

US 2015/0114236 A1    Apr. 30, 2015

Related U.S. Application Data

(60) Provisional application No. 61/351,809, filed on Jun. 4, 2010.

(51) Int. Cl.
*A47J 44/00* (2006.01)

(52) U.S. Cl.
CPC ............... *A47J 44/00* (2013.01); *Y10S 901/30* (2013.01); *Y10S 901/41* (2013.01); *Y10S 901/46* (2013.01)

(58) Field of Classification Search
CPC .......... A21B 1/48; A47J 36/165; A47J 44/00; A47J 27/16; A47J 27/62; A47J 37/10; A47J 37/046; A47J 37/1228
USPC ........... 99/324, 334, 341, 344, 348, 352, 355, 99/357, 423, 325; 901/1, 15, 16, 31; 222/367, 368
See application file for complete search history.

(56) References Cited

U.S. PATENT DOCUMENTS

| | | | | |
|---|---|---|---|---|
| 4,229,136 A * | 10/1980 | Panissidi | ........... | 414/673 |
| 4,260,319 A * | 4/1981 | Motoda et al. | ........... | 414/591 |
| 4,588,349 A * | 5/1986 | Reuter | ........... | 414/807 |
| 5,386,762 A * | 2/1995 | Gokey | ........... | 99/326 |
| 5,833,097 A * | 11/1998 | Ruth | ........... | 222/368 |
| 7,174,830 B1 * | 2/2007 | Dong | ........... | 99/334 |
| 7,703,639 B2 * | 4/2010 | Landau et al. | ........... | 222/1 |
| 8,276,505 B2 * | 10/2012 | Buehler | ........... | 99/326 |
| 8,276,506 B2 * | 10/2012 | Tojo et al. | ........... | 99/334 |
| 2004/0086368 A1 * | 5/2004 | Downs et al. | ........... | 414/741 |
| 2004/0173103 A1 * | 9/2004 | Won | ........... | 99/326 |
| 2005/0193901 A1 * | 9/2005 | Buehler | ........... | 99/468 |
| 2009/0099691 A1 * | 4/2009 | Tojo et al. | ........... | 700/253 |

* cited by examiner

*Primary Examiner* — Dana Ross
*Assistant Examiner* — James Sims, III (57) ABSTRACT

A robotic cooking apparatus that can cook dishes using a computer recipe provided by a user and ingredients stored in it. Able to adjust the recipe based on user preference data. Cooking apparatus comprises of ingredient input section, cooking stations, pre-processing and post-processing station. Input section has trays and can be at room temperature or refrigerated for storing perishable ingredients. Robot head assembly is able to transfer ingredients, identify and measure as well as take inventory periodically. Cooking apparatus is connected to a network and can be operated remotely by a fixed or handheld device and monitor its operation remotely.

16 Claims, 6 Drawing Sheets

ROBOTIC KITCHEN TOP COOKING APPARATUS AND METHOD FOR PREPARATION OF DISHES USING COMPUTER RECIPIES

CROSS REFERENCE TO RELATED APPLICATIONS

This application claims benefit of U.S. Provisional Application Ser. No. 61/351,809, filed on Jun. 4, 2010, entitled "ROBOTIC KITCHEN TOP COOKING APPARATUS AND METHOD FOR PREPARATION OF DISHES USING COMPUTER RECIPES," and is hereby incorporated by reference in its entirety.

BACKGROUND OF THE INVENTION

The present invention generally relates to an apparatus for preparing dishes using recipe steps and cooking conditions coded as a computer program recipe executed by a kitchen top robotic cooking machine supplied with the required ingredients with minimal user intervention while adjusting recipe to tastes of the user.

A need exists for a cooking machine or apparatus that is able to provide good quality custom food to people who generally lack the capability and understanding to prepare healthy food dishes on their own or do not have the time for engaging in cooking activity on a regular basis. With the change in the human society and behavioral pattern over the last several decades ever increasing number of people lack cooking skills and are becoming more dependent on processed foods, paying dearly for cooking services as in a restaurant or suffer consequences of unhealthy eating habits. Recent surveys have also suggested that a fairly large proportion of population is now medically obese and at risk of several adverse health conditions due to inability to cook and consume traditional food on a regular basis. Such a robotic cooking machine apparatus is also helpful in a restaurant as a cooking aid to an experienced chef to impart consistency and quality with less supervision of unskilled employees such that the price of gourmet dishes served can be reduced making them affordable for many.

Some businesses have recognized these issues and have started healthy meal delivery programs such as disclosed in US. Pat Application 20090094121 by Mark et Al assignee Nutrisystem Fresh Inc. However these programs are preset, expensive and cannot be effectively customized for every individual and meals can be repetitive rendering them boring and unpalatable to an individual over time even though made with good consistency. There needs to be a way where people can actively participate in their own healthy nourishment and also enjoy the process without the requirement to invest time and effort to acquire very high levels of cooking skills or occupy their precious time on a daily basis that could be used for more productive activities.

Chapin has disclosed a method and apparatus for automated Chinese stir-fry cooking in U.S. Pat. No. 4,503,502, however the apparatus' disclosed cannot help general cooking which is more complicated than Chinese stir frying and usually needs multiple steps such as when cooking pasta it is necessary to first boil the pasta and then subsequent cooking with cheese and vegetables after draining the water and cooking in a different pot. U.S. Pat. No. 4,649,810 discloses another apparatus incorporating a carousal and a lid, however still unable to cook complex dishes requiring multiple steps in multiple vessels and hence need for human intervention. U.S. Pat. No. 4,700,617 discusses an automatic frying machine for Chinese dishes also not able to cook complex dishes more involved, same case as the industrial size frying machine placed on a commercial burner disclosed in U.S. Pat. No. 6,647,864. An apparatus with multiple wok stations is disclosed in U.S. Pat. No. 4,919,950 more suited for a takeout restaurant and there is no means for doing varied cooking activity at multiple stations rather they are meant to fry similar Chinese dishes at multiple stations for increasing throughput. Serving and cleaning devices have been added to the cooking machine disclosed in U.S. Pat. No. 6,112,645 and vending capability is added in U.S. Pat. No. 6,843,166, however still not suitable for more complex cooking in general.

U.S. Pat. No. 7,174,830 incorporates robotic chefs into the kitchen to replicate human chefs and U.S. Pat. No. 7,461,589 discloses a single cooking pot counter top cooking machine. Further U.S. Pat. No. 7,485,830 discloses an automatic cooking device with a single station capable to addition of various types of motions for cooking. All these cooking devices, machines and apparatus have been invented with only a single cooking mode such as frying, stir frying and at a single station and cannot be used for general cooking as pasta, curries etc which need multiple steps and preparation of semi cooked ingredient combinations prior to final mixing and cooking of the main dish. Also most of the prior art is designed for use in a commercial environment whereas it is under close observation which is not appropriate for home cooking and a more reliant device is needed.

A need therefore exists to provide a robotic cooking apparatus that is more flexible to allow cooking of dishes that need more than one station to prepare intermediate cooked components and involve multiple steps that may involve transfer of semi-cooked ingredients from individual stations to temporary storage, or between cooking stations effortlessly without the need for human intervention. In addition, there is a need for a method to be able to adjust a recipe to individual tastes, sensibilities and moods for longer term usability of such a device. Also there is a need to be able to observe, monitor and control such a device remotely using a wireless device or via intelligent networked system such as the internet safely.

BRIEF SUMMARY OF THE INVENTION

The present invention provides a method and apparatus to automatically cook dishes using a computer coded recipe and cooking ingredients stored in the apparatus with multiple cooking stations allowing transfer of ingredients between stations as well as intermediate storage or pre-processing as needed for general cooking and more complex gourmet dishes.

An object of the invention is to provide a cooking apparatus that has one or more cooking stations such that the items being cooked can be transferred between them. Such as while cooking pasta, one station is used to boil the pasta and hold the broth. A second station can accept the boiled pasta from the first station and also capable to transfer some broth to the final preparation as and when needed. Another object of the invention is to provide pre-processing stations such as mixer, grinder, soaker or post-processing such as cooler or freezer.

According to an embodiment of the invention, there are cooking ingredients such as spices, salt and condiments are provided into suitable storage bins or racks and able to be delivered into any of the cooking stations inside the apparatus in a timely fashion using a custom robotic device with several degrees of freedom of motion and in measured quantities as directed by the computer program. Such ingredients can be delivered directly to cooking station pans, pots, vessels or to intermediate stations such as a mixing bowl for pre-processing or post processing such as additional grinding some spices, emulsify by adding water and similar operations as known in the art of cooking. Some of the bins can be environmentally controlled or refrigerated to be able to store perishable ingredients over extended periods.

Another object of the invention is to provide a means to feed perishable ingredients into the cooking station and a means to identify them. Robotic transfer mechanisms are used to feed such ingredients to the cooking stations while identifying, scanning and sensing.

Yet another object of the invention is to provide a method to control such a robotic cooking apparatus using computer or other programmable logic control (PLC) to measure quantities and times. In an embodiment one or more cameras mounted in a fixed location or on robotic end effectors are used to remotely monitor the cooking processes using an online device such as a computer on a network or a wireless handheld device such as a mobile phone. In another embodiment, user input to control including but not limited to start, stop, selecting and editing recipes is also received via such remote devices being used for monitoring the kitchen top robotic cooking device. The cameras together with computer vision techniques are also used for identification of the ingredients, their presence and location for proper operation of the robotic cooking device.

A further object of the invention is to store information about the user tastes and sensibilities and ability to modify a given recipe by changing the quantities of ingredients such as salt, sugar, spices or making substitution such as olive oil for butter, removing peanut butter or oil. Another object is to have the robotic apparatus monitor the ingredient levels periodically and inform the user for a need to replenish or submit and online order if permitted by user.

Additional features and advantages of the present invention are described in, and will be apparent from, the detailed description of the preferred embodiments and from the drawings.

BRIEF DESCRIPTION OF THE SEVERAL VIEWS OF THE DRAWING

The following is a description, by way of example only, of different embodiments of the mechanism, its variations, derivations and reductions.

DETAILED DESCRIPTION OF THE INVENTION

Figure 1:
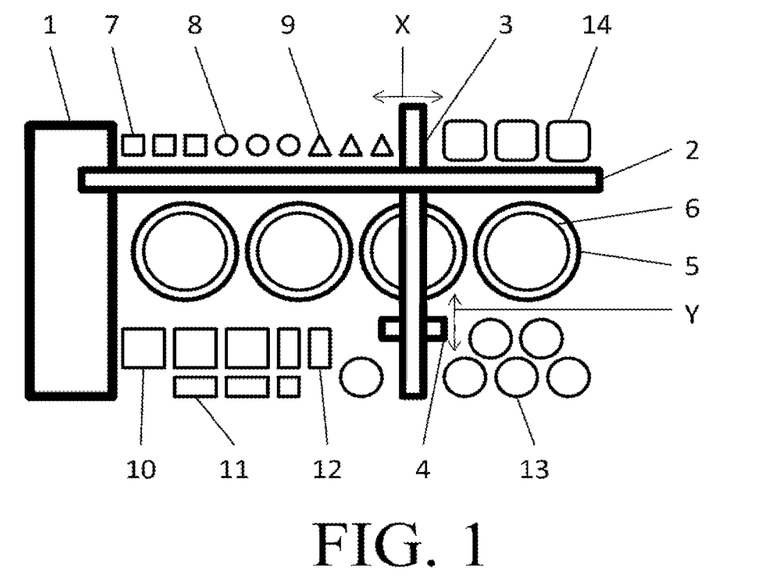
FIG. 1 is a top view of a robotic cooking apparatus showing an inline arrangement of cooking stations.

Now referring to the drawings, wherein like numerals designate like components, FIG. 1 shows a robotic cooking apparatus with a base frame 1 resting on a base surface such as a kitchen countertop (not shown) using leveling legs (not shown). The base frame may also have castor wheels (not shown) for moving the machine. A gantry style robot comprising of X-axis guide 2, Y-axis guide 3 and a robotic head assembly 4 is used to pick, place, transfer perishable ingredient cups 10, 11, 12, 13, non-perishable containers 7, 8 or cooking tools such as ladles, stirrers 9 to cooking pots or vessels 5 placed on heaters 6. The robotic head assembly 4 has other functions as to identify and measure as would be explained in further detail later. Any other robots such as SCARA, serial or parallel robot can also be used instead of the gantry style robot design as is known in the art. Temporary storage or mixing stations 14 are also provided.

Figure 2:
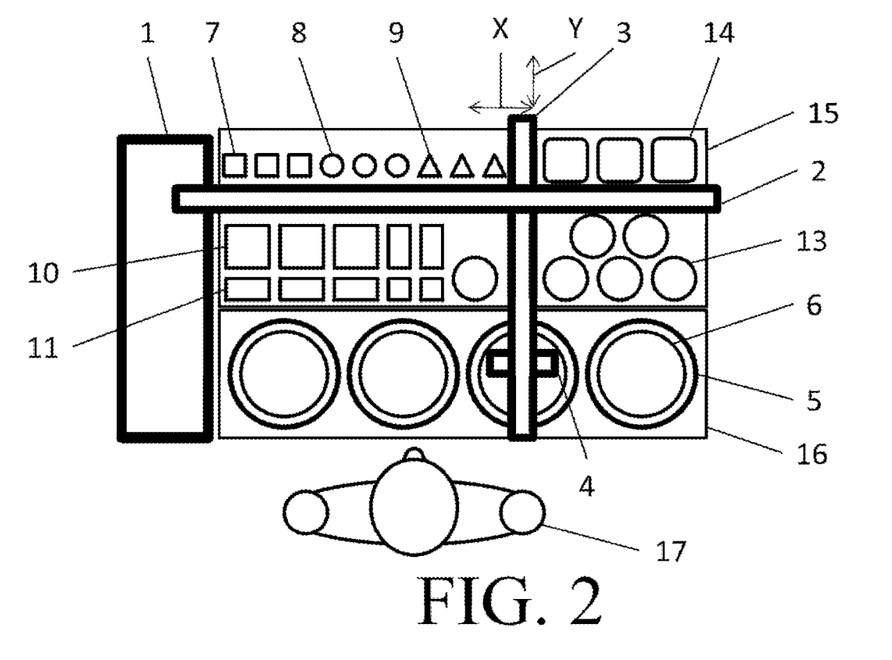
FIG. 2 is a top view of a modular robotic cooking apparatus showing the cooking stations closer to one side facing a user and ingredients organized in trays.
Figure 3:
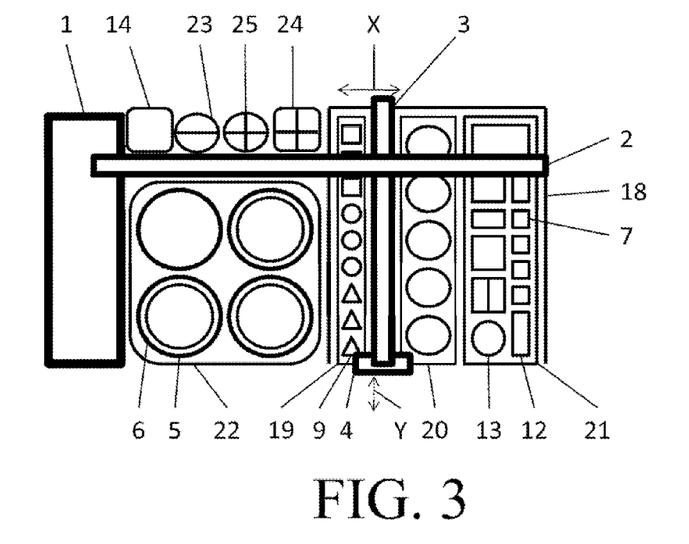
FIG. 3 is a top view of another robotic cooking apparatus with the cooking stations grouped together and ingredients in retractable sliding drawer trays.
Figure 4:
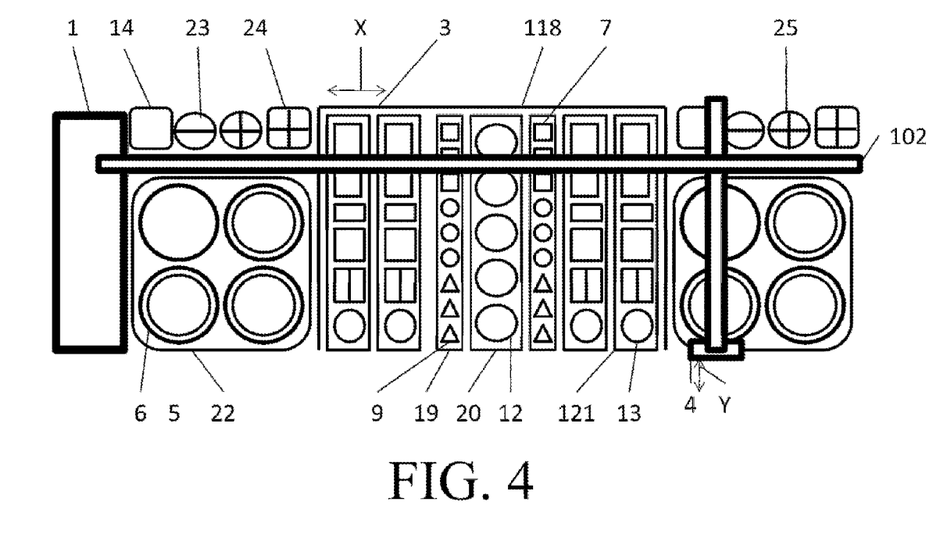
FIG. 4 is a robotic a cooking apparatus with added modules for cooking station and larger tray module to increase capacity.

FIG. 2. Shows another cooking apparatus organized in modular sections, the ingredients section 15 and cooking station section 16 which now faces a user 17. Having such modular section helps in manufacturing and shipping the apparatus in sub-sections that would be assembled at the site of use. FIG. 3 shows another robotic cooking apparatus with cooking stations grouped together as a section 22 as opposed to inline configuration illustrated in FIG. 1. Further the ingredient section 18 is organized into cabinet drawer individual sliding trays 19, 20, 21 that is pulled out or slid in by a user and populated or cleaned with ingredients while removed from the cooking apparatus. Some of the bins are environmentally controlled or refrigerated with a lid that can be opened when accessing those ingredients. Conventional compressed gas based refrigeration is used or other newer technologies such as peltier based can also be used. A pre-processing station such as a mixer 23 and a grinder 25 are added to this apparatus. A storage area 24 is used for holding cooking tools such as ladles, stirrers, spatulas. FIG. 4 shows a robotic cooking apparatus where the modular design has been used to add a second cooking section and additional trays such as 121, only the X-guide needed to be elongated to cover the larger work area. Such a kitchen top cooking apparatus is more useful in a commercial setup such as a restaurant. The trays 121 having all the perishable ingredients needed for a particular dish and special condiments is pre-stored and quickly entered or replaced frequently as a single tray corresponding to a specific dish with the non-perishable ingredients such as regular spices, salts, other usual condiments in plenty are stored in 19, 20 without the need for frequent replacement. In some embodiments, a overflow or spill catch tray (not shown) is also used around the cooking stations and other areas where spills may come from robotic material movement or overflows inside cooking vessels.

Figure 5:
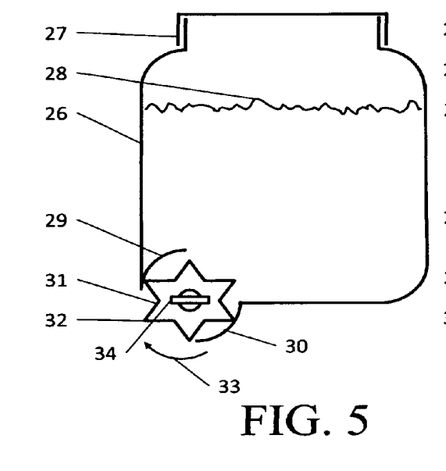
FIG. 5 shows a non-perishable ingredient storage container with built-in measuring and dispensing mechanism.
Figure 6:
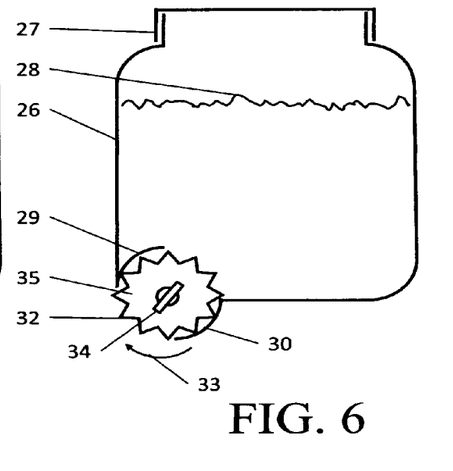
FIG. 6 shows another non-perishable ingredient storage container with a finer measurement or dispensing wheel.

FIG. 5 shows a condiment, spice, oil storing and dispensing container. As is known to one familiar with the art of cooking, it is very important to accurately measure the ingredients and any change in quantities as specified in a recipe would produce a very different result than intended. It is also necessary to prevent exposure of spices and condiments to preserve freshness and quality as is the practice of using sealed jars and similar containers. However it is difficult for a robot to open the lid of a jar, pick a measured amount and transfer to a cooking vessel, which are a complicated series of operations requiring dexterity. The container shown in FIG. 5 solves these problems with an ingredient 28 being stored in a container 26 with lid 27 generally closed and used only for replenishing it manually when needed. For accurately measuring and dispensing contents a toothed measurement wheel 31 is held between curved walls 30 and 29. The wheel 31 can be rotated by turning a keyed slot 34 when needed but seals the contents normally preserving freshness and aroma. Rotating this wheel 31 in the direction 33 causes a fixed amount of ingredients to be trapped between two teeth, wall 30 and transported towards the opening to dispense to a receiver which could be either a cooking station or a pre-processing station such as a mixer or grinder. The unit of measurement is the volume enclose by two contiguous teeth 32 of the wheel and wall 30 and is designed to be a sub multiple of popular measuring unit volumes such as a tea spoon or something more suitable as needed for that particular ingredient. So contents can be dispensed by rotating the wheel by a calculated angle based on total quantity to be dispensed using a key driver such as a motor mounted on a robot head assembly. Ingredients could be powdered such as salt, baking powder, granular such as sugar, seeds, crushed spices, pastes or liquids such as oil, garlic paste. For liquids such as oil the wheel makes a snug seal with the walls so that there is no leaking of the contents when not dispensed. FIG. 6 shows another container with a wheel with smaller teeth for finer measurements and the unit in this case could be a "pinch". The container can have varied size, shape and dispensing wheel location on its body as suited to various ingredients. The container walls are preferably transparent or have a transparent area such as a vertical slot to be able to measure the ingredient levels and quantities used with aid of laser sensor and receivers mounted on robot head assembly 4.

Figure 7:
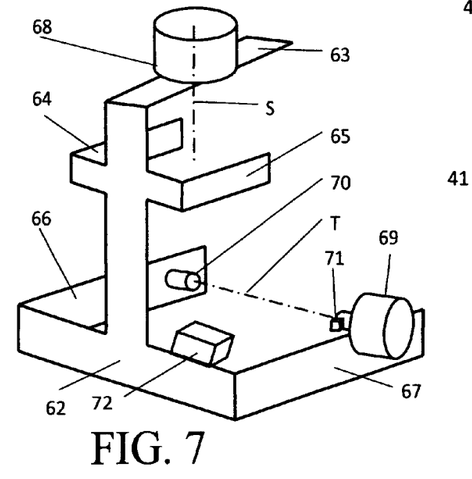
FIG. 7 shows a robotic head assembly used to transfer ingredients to cooking stations and perform other activities needed by the robotic cooking apparatus.

FIG. 7 illustrates the robot head assembly 4 in detail and comprises of a motor 68 that is mounted to the Y-axis slider of the gantry robot such that the head assembly is able to swivel about a vertical swivel axis S to align with the various objects it may pick up place or operate. The swivel motor 68 carries a robot head frame 63 with multiple appendage pairs such as 64, 65 and 66, 67 that are used to pick containers or cups of various sizes and shapes. A tilt motor 69 is fixed on the appendage arm 67 with a key 71 to tilt a cup or container about a tilt axis T while cup is held on a free rotation pin 70 and key 71 or turn a measuring wheel 32 as on a container described earlier. A bar code reader 72 is mounted on the lower appendage base area 62 in order to read the codes or markings on ingredient cups or containers being picked or measured. The robot head also carries cameras (not shown) and additional appendages or fixtures can be added as needed. A weight sensing device is added to the robot appendages (not shown) to measure the weight or quantities of ingredients when picking and transferring.

Figure 8:
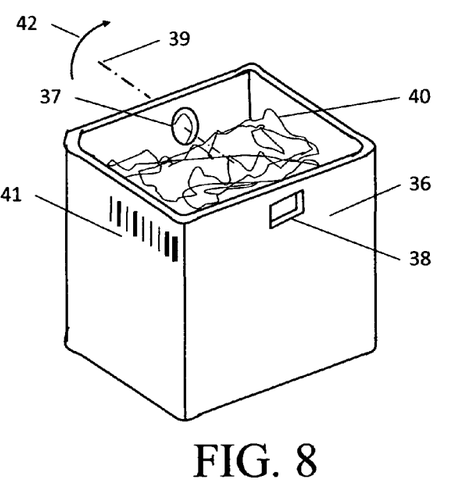
FIG. 8 is a container to store mostly perishable or fresh items and compatible with robotic head assembly for picking and dispensing its contents.

FIG. 8 shows a ingredient cup for use with mostly fresh or perishable items such as vegetables, cereals, meat. The cup has a square or keyed cut 38 on one side of the main body 36 and a circular hole 37 on the other side such that a robot head assembly illustrated in FIG. 7 can pick up and tilt the cup at an angle about axis 39 aligned with axis T of robot head assembly described earlier or upside down after moving it over a delivery area such as a cooking station or a pre-processing station. The cup can be any shape such as cicular or other and not necessarily rectangular as shown in this figure. The cup has a bar code 41 for identification which includes its size and information about its contents 40. The cup is a re-usable design and used cups are moved to an area for used cups and stacked for saving space. An empty cup is used along with proper sequence of actions by the robot head to scoop ingredients or prepared dishes from a cooking vessel or another storage bin or container. The cups are placed on a bin tray such as 121 described before. Some cups are designed as disposable sealed containers with factory prepared ingredients with proper identification in the form of bar code. The cups are also preferably made from transparent material such that a laser sensor is able to measure the quantity and existence of an ingredient inside it by shining laser sensors through it to receivers across it.

Figure 9:
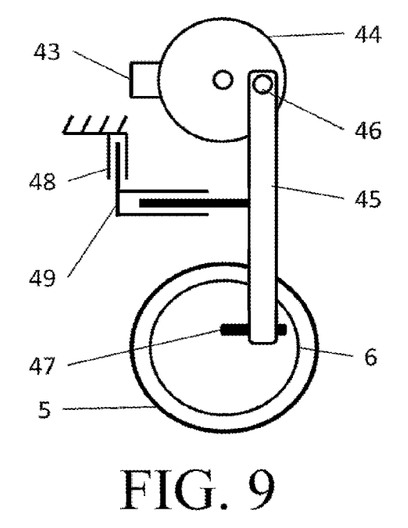
FIG. 9 shows a mechanism used for stirring the contents of a cooking pot with circular motion only.
Figure 10:
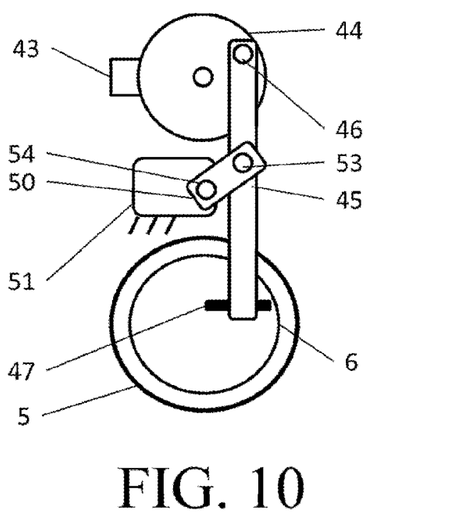
FIG. 10 shows another mechanism used for stirring the contents of a cooking pot with circular motion only.
Figure 11:
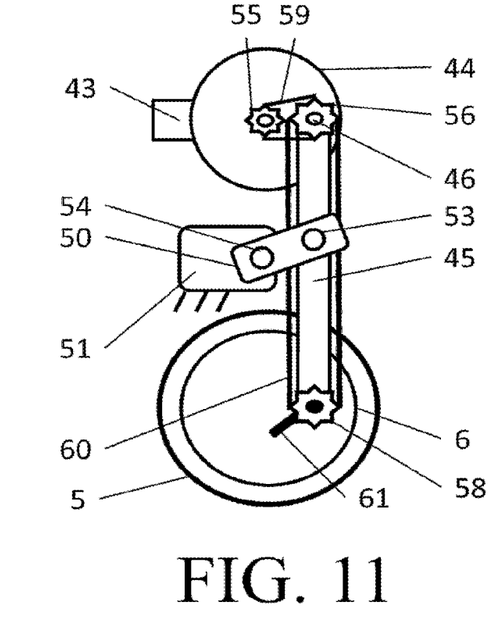
FIG. 11 shows a mechanism used for stirring the contents of a cooking pot or vessel in a planetary motion.
Figure 12:
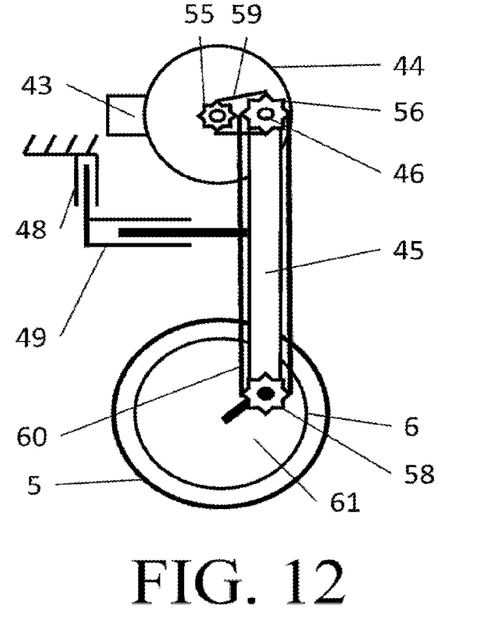
FIG. 12 shows another mechanism used for stirring the contents of a cooking pot or vessel in a planetary motion.

FIGS. 9 to 12 show some stirring mechanisms that are used with the cooking stations. In cooking stirring is very important for properly mixing the ingredients being cooked and for uniform application of heat without burning the contents of a vessel. FIG. 9 shows a stirring mechanism moving a stirrer 47 in a fixed circular motion inside a pot or vessel 6 placed on a heater 5 from a distance by mounting it on a offset bar 45 attached to a crank wheel 44 with a revolute joint 46. The crank wheel is driven by a motor 43 and the offset bar is constrained by sliders 48 and 49 to move in a circular motion only. FIG. 10 shows a variation where a crank arm 50 is attached to the offset bar 45 with revolute joint 53 and a fixed based 51 with revolute joint 54 replacing the sliders 48, 49 as in FIG. 9. FIG. 11 illustrates a stirring mechanism that adds a spinning motion to the stirrer 61 along with the circular motion about the center of the cooking pot 6 resulting in a planetary type of combined motion similar to that of moon around the sun. The stirrer 61 is mounted on the offset bar 45 using a revolute joint and is attached to a pulley wheel 58 connected to a second pulley 56 mounted on the other side of the offset bar using driving pulley 60. Pulley wheel 56 is in turn driven by pulley 55 using belt 59. Pulley 55 is driven by same motor 43 producing the circular motion or an independent motor can also be used. FIG. 12 shows a variation where sliders 48 and 49 constrain the offset bar 45 to move in a circular motion. The pulleys and wheels can be replaced by other motion and power transferring devices such as lead screws, gears as known in the art.

Figure 13:
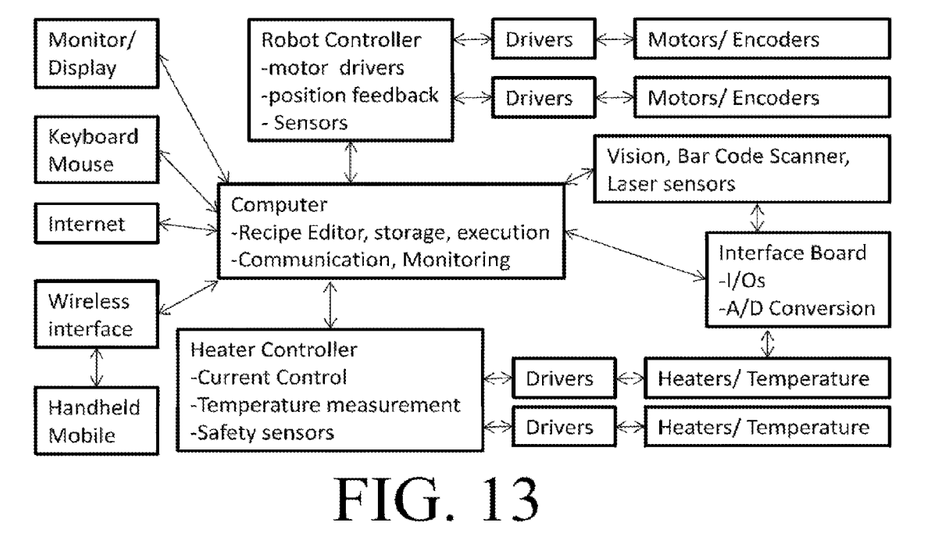
FIG. 13 shows a control scheme block diagram of the robotic cooking apparatus.

FIG. 13 shows a schematic block diagram for operating and controlling the cooking apparatus. Several elements as used by the cooking apparatus including but not limited to motors, encoders, limit switches, Laser sensors, receivers, lead screws, gearboxes, temperature sensors, heating elements, over temperature switches, power supplies some of which have not been shown but their use and integration would be apparent to those skilled in the art of robotics and heating devices. Further computer elements including but not limited to micro-processor boards, memory, storage, interface boards, control circuits, input devices such as keyboards, mice, touch screens, output devices such as monitors, display units, communication devices such as Ethernet, wireless, USB, RS485, RS232, parallel or serial ports are also used and some have not been shown. Control algorithms such as PID for position, orientation and heater temperature control are also used.

Figure 14:
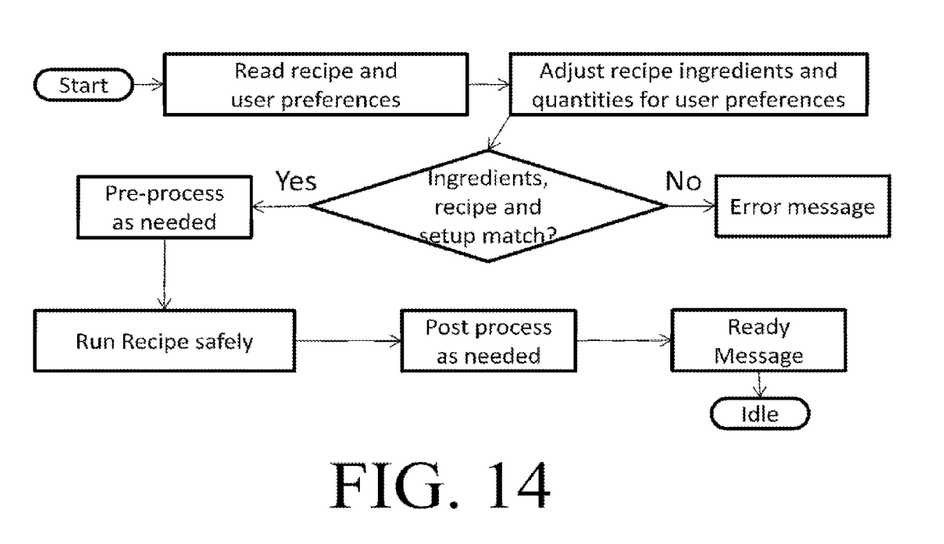
FIG. 14 shows a flowchart explaining a method of operation of the robotic cooking apparatus.

FIG. 14 Shows a flowchart explaining the major steps needed to produce a dish using the cooking apparatus embodiments disclosed. Before the cooking can start a user needs to select a recipe file that is intended to be cooked and place the main ingredients in the trays. User may also pick user preference file if he/she intends to modify the recipe as per his/her preferences. As an example if user intends to prepare peas, mushroom, chicken noodle soup lightly salted with olive oil substituted for butter, he/she would pick a chicken noodle soup recipe and preferences file with stored information that user likes lightly salted and prefers substitution of butter with olive oil. User would place the perishable ingredients such as peas, mushrooms, chicken on cups in a tray. The cooking apparatus should have pre-stored salt, sugar, olive oil, water and other regular ingredients. In case some of the ingredients are missing that are needed by the recipe being executed, user would be informed through a message that is sent to a display unit or a handheld remote device. If there are no problems encountered, then the recipe steps would be executed including pre-processing and post-processing steps and a message sent to user on completion. User does not need to be present during the execution of the recipe and dish being cooked however can observe on a remote device as to the progress of the dish preparation and status.

Figure 15:
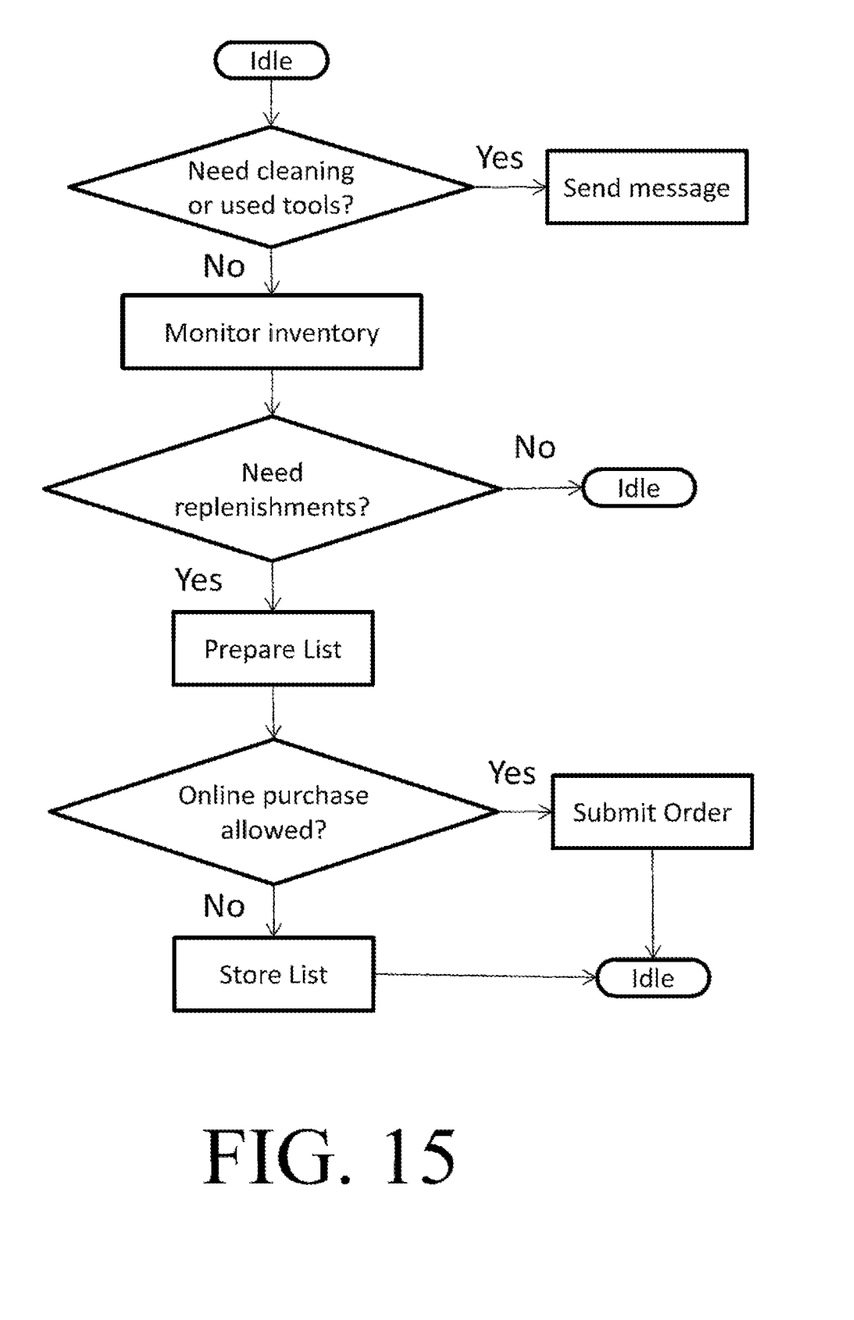
FIG. 15 shows a flowchart for explaining idling operation of the robotic cooking apparatus.

FIG. 15 shows a flowchart explain the activities that the apparatus performs when it is not cooking. When the cooking apparatus is idle it performs the tasks of taking inventory of common ingredients that should be generally stored as instructed by a user such as salt and spices. The robot head assembly picks up containers and using level sensors or weight identifies the quantities and compares them against a list of prescribed comfort level quantities specified by the user or determined based on rate of usage to prepare a list of items that need to be replenished from time to time. The apparatus can also order such items online if the user has permitted it to do so periodically.

Although the invention has been described herein in connection with various preferred embodiments, there is no intention to limit the invention to those embodiments. It should be understood that various changes and modifications to the preferred embodiments will be apparent to those skilled in the art. Such changes and modifications may be made without departing from the spirit and scope of the present invention and without diminishing its attendant advantages. Therefore, the appended claims are intended to cover such changes and modifications.

What is claimed is:

1. A robotic cooking apparatus comprising:
   at least one ingredient input section with a plurality of containers holding ingredients;
   at least one toothed wheel including two contiguous teeth held in walls of at least one container of the plurality of containers to provide a seal that preserves freshness and aroma of ingredients stored in said container, wherein the two contiguous teeth and a wall of said container enclose a volume of ingredient and is designed to be a sub multiple of popular measuring unit volumes;
   a plurality of cooking stations, each having a source of heat applied to a respective one of a plurality of vessels to be heated for cooking ingredients transferred to the vessel;
   at least one gantry style robot including a frame, an x-axis guide mounted to the frame, a y-axis guide mounted for movement along the x-axis guide, and at least one robot head assembly mounted for movement along the y-axis guide, the robot head assembly being capable of picking each container up from the ingredient input section, and transferring the container with the ingredients in the container from the ingredient input section to at least a selected one of the vessels in one of the cooking stations;
   at least one driver mounted on the robot head assembly configured to turn the at least one toothed wheel to dispense the ingredients, such that turning the at least one toothed wheel causes known quantities of ingredient to be dispensed from the container into a selected vessel when the container is at the selected vessel;
   a tilt motor, the robot head being capable of holding a cup and being operable by the tilt motor to tilt the cup to dispense items from the cup into the selected vessel;
   a mixing tool positioned to stir or mix the ingredients being cooked in the selected vessel;
   an input device for a user to select a recipe file and to enter user preferences and switching between allowing and disallowing online purchase;
   an output device;
   at least one level sensor
   at least one communication device; and
   at least one computer or electronic controlling device, in an non-idle mode of the robotic cooking apparatus, capable of reading a recipe from the recipe file listing ingredients, quantities, cooking times and conditions, modifying at least one of an ingredient and a quantity of the recipe based on the user preferences, capable of making ingredient substitution, able to adjust a recipe to individual tastes, sensibilities and moods for longer term usability, determining whether the recipe and ingredients in the containers match, if the recipe and ingredients in the containers do not match then providing an error message through the output device, and, if the recipe and ingredients in the containers match, then executing the recipe as modified by the user preferences by directing and monitoring the cooking stations, the gantry style robot and the robot head assembly, wherein multiple cooking stations allowing transfer of ingredients between stations without the need for human intervention, and in an idle mode of the robotic cooking apparatus, taking inventory of common ingredients among the ingredients that should be stored by picking the containers holding the common ingredients up using the gantry style robot, determining a quantity in the container using the level sensor, comparing the quantity with a prescribed comfort level quantity, and preparing a list of ingredients that need replenishment based on the comparisons, determining whether online purchase is allowed, and, if online purchase is allowed, ordering the ingredients online using the communication device.

2. A robotic cooking apparatus as in claim 1, wherein at least one said cooking stations further comprises of at least one mixer for pre-processing the ingredients.

3. A robotic cooking apparatus as in claim 1, further comprising a cooking tools storage section.

4. A robotic cooking apparatus as in claim 1, wherein the robot head assembly is capable of swiveling and tilting the container using the driver.

5. A robotic cooking apparatus as in claim 1, wherein the robot head assembly is equipped with at least one reader to read code markings on the ingredient containers.

6. A robotic cooking apparatus as in claim 1, wherein the robot head assembly is equipped with sensors for measuring ingredient levels in the container.

7. A robotic cooking apparatus as in claim 1, wherein the ingredient input section is organized as a cabinet with retractable sliding drawers having pockets for holding ingredient cups or containers.

8. A robotic cooking apparatus as in claim 1, wherein at least one ingredient is stored in the container with the at least one toothed wheel held in the walls of the container, the toothed wheel turned by the driver to dispense the ingredient held between the teeth and the walls of the container such that the volume enclosed by two contiguous teeth of the wheel and wall is designed to be a sub multiple of a tea spoon, wherein said container further includes a lid that is generally closed and used only for replenishing container manually when needed and said teeth make a snug seal with the walls so that there is no leaking of the contents.

9. A robotic cooking apparatus as in claim 1, wherein the cup, according to a sequence of actions, is movable by the gantry style robot to scoop ingredients from one of the vessels, the cup has a bar code for identification which includes its size and information about its contents, used cups are moved to an area for used cups and stacked for saving space, cups are designed as disposable sealed containers with factory prepared ingredients.

10. A robotic cooking apparatus as in claim 1, wherein the mixing tool includes a stirrer rotated in a circular motion using a motor crank wheel and an offset bar constrained to move in a circle.

11. A robotic cooking apparatus as in claim 1, wherein the mixing tool includes a stirrer rotated in a planetary motion as a combination of a spinning stirrer at the end of a offset bar being moving in a circle.

12. A robotic cooking apparatus as in claim 1, wherein the computer or electronic controller is connected to the internet.

13. A robotic cooking apparatus as in claim 1, further comprising:
   a keyed slot in the at least one toothed wheel, wherein the driver turns the keyed slot in the at the least one toothed wheel dispensing ingredients in measured quantities to the vessel.

14. A robotic cooking apparatus as per claim 1 where user preferences are used to customize a dish by modifying the recipe with a preference file with stored information that the user likes.

15. A robotic cooking apparatus as per claim 1 wherein the recipe can be edited and downloaded to a cooking apparatus remotely, operations of the cooking apparatus can be monitored remotely.

16. A robotic cooking apparatus as per claim 1 wherein ingredient usage is monitored and replenishment times are predicted based on usage rates.

* * * * *